United States Patent
Cho et al.

(10) Patent No.: US 10,619,577 B2
(45) Date of Patent: Apr. 14, 2020

(54) INTERNAL COMBUSTION ENGINE

(71) Applicant: HONDA MOTOR CO., LTD., Tokyo (JP)

(72) Inventors: Masaki Cho, Wako (JP); Hiroyuki Natsui, Wako (JP); Kenji Nishida, Wako (JP); Hirotaka Kawatsu, Wako (JP); Tomiyuki Sasaki, Wako (JP); Ryota Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 60 days.

(21) Appl. No.: 15/711,637

(22) Filed: Sep. 21, 2017

(65) Prior Publication Data

US 2018/0094592 A1 Apr. 5, 2018

(30) Foreign Application Priority Data

Sep. 30, 2016 (JP) .................................. 2016-192481

(51) Int. Cl.
   *F02D 13/02* (2006.01)
   *F02D 41/30* (2006.01)
   *F02D 41/00* (2006.01)

(52) U.S. Cl.
   CPC ..... *F02D 13/0261* (2013.01); *F02D 13/0207* (2013.01); *F02D 41/30* (2013.01); *F02D 13/02* (2013.01); *F02D 41/3005* (2013.01); *F02D 2041/001* (2013.01); *F02D 2200/04* (2013.01); *Y02T 10/18* (2013.01)

(58) Field of Classification Search
   CPC .. F02D 13/0261; F02D 41/30; F02D 13/0207; F02D 13/02; F02D 41/3005; F02D 2200/04; F02D 2041/001; Y02T 10/18
   See application file for complete search history.

(56) References Cited

U.S. PATENT DOCUMENTS

| | | | |
|---|---|---|---|
| 5,983,872 A | 11/1999 | Ito et al. | |
| 6,039,029 A * | 3/2000 | Nagasaka | ............. F02B 31/087 |
| | | | 123/336 |
| 6,131,554 A * | 10/2000 | Ito | ........................... F02B 29/00 |
| | | | 123/184.56 |

(Continued)

FOREIGN PATENT DOCUMENTS

| EP | 0 835 995 A2 | 4/1998 |
|---|---|---|
| EP | 0 856 649 A2 | 8/1998 |

(Continued)

*Primary Examiner* — Patrick Hamo
*Assistant Examiner* — Wesley G Harris
(74) *Attorney, Agent, or Firm* — Birch, Stewart, Kolasch & Birch, LLP

(57) ABSTRACT

An internal combustion engine is configured to satisfy the relation expressed by $0 < Rv < 0.000438 \times \theta^2 - 0.0407 \times \theta + 1.55$ in a range of an intake valve overlap amount $\theta(°)$ from 20° to 45°, where Rv denotes an intake port volume ratio obtained by dividing an intake port internal volume Vp by a cylinder stroke volume Vc, and the intake valve overlap amount $\theta(°)$ is a crank angle from an intake valve opening timing when the intake valve starts opening to an intake top dead center of the piston. The engine improves output performance as well as both combustion performance and emission performance by suppressing reverse flow of the combustion gas into the intake system.

15 Claims, 9 Drawing Sheets

(56) References Cited

U.S. PATENT DOCUMENTS

| | | | |
|---|---|---|---|
| 6,848,408 B1 * | 2/2005 | Mendler | F02B 27/00 123/184.21 |
| 7,047,934 B1 | 5/2006 | Kawabe et al. | |
| 2006/0016422 A1 | 1/2006 | Kuo et al. | |
| 2006/0137634 A1 * | 6/2006 | Vattaneo | F01L 9/02 123/90.12 |
| 2009/0007860 A1 | 1/2009 | Kato et al. | |
| 2013/0110377 A1 | 5/2013 | Sukegawa et al. | |

FOREIGN PATENT DOCUMENTS

| | | | |
|---|---|---|---|
| EP | 1 447 550 A1 | 8/2004 | |
| JP | 63-176607 A | 7/1988 | |
| JP | 7-217410 A | 8/1995 | |
| JP | 8-4503 A | 1/1996 | |
| JP | 10-110619 A | 4/1998 | |
| JP | 10-212980 A | 8/1998 | |
| JP | 3715059 B2 * | 11/2005 | F02B 61/02 |
| JP | 2006-57503 A | 3/2006 | |

* cited by examiner

INTERNAL COMBUSTION ENGINE

TECHNICAL FIELD

The present invention relates to an internal combustion engine for improving output performance as well as both combustion performance and exhaust gas emission performance by suppressing reverse flow of combustion gas into the intake system.

BACKGROUND ART

The generally used internal combustion engine is designed to set a valve overlap period in which both the intake valve and the exhaust valve are simultaneously opened around the intake top dead center in order to improve combustion performance. Concurrent opening of both the intake valve and the exhaust valve causes reverse flow of the combustion gas into the intake port. The reverse flow increases residual gas concentration in the compression stroke, resulting in deterioration both in the combustion performance and the exhaust gas emission performance.

In order to compensate for the above-described deterioration, a variable valve train for varying the valve lift amounts or the valve timings is employed. At low rotational speed, the variable valve train operates to reduce the valve overlap period for preventing reverse flow of the combustion gas into the intake port so as to improve both the combustion performance and the emission performance. At high rotational speed, the variable valve train operates to prolong the valve overlap period for improving the output performance.

On the other hand, in order to prevent noise around the valve train system, the valve lift curve is required to be a sufficiently long buffer curve for reducing noise generated upon seating of the intake valve and the exhaust valve. In addition to the above, excessive reduction in the valve overlap period in the aforementioned state results in failing to ensure sufficient valve opening period and sufficient valve lift amount, resulting in disadvantage of reduced output of the engine.

In case of employing the variable valve train of cam nose switchable type, switching of the cams causes difference in the valve lift curve, between a cam selected to improve emission performance, and a cam selected to improve output performance. The use of the variable valve train of the above-described type therefore causes an output discontinuity.

In the case of employing the variable valve train of cam phase changing type, the effect of improving both the output performance and the emission performance is limited owing to its structurally limited phase changing angle. Further, the valve timings during the period other than the valve overlap period are made inappropriate, resulting in deteriorated thermal efficiency.

The use of the variable valve train causes a cost increase, and further causes such problems as complication of the entire system of the valve train, and lowered rotational speed limit.

PRIOR ART DOCUMENT

Patent Document

[Patent Document 1] JP H10-110619 A

SUMMARY OF INVENTION

Technical Problem

The present invention has been made in order to solve the aforementioned problem. It is an object of the present invention to provide an internal combustion engine which has a simply structured valve train system for cost reduction. The internal combustion engine according to the present invention is designed to improve the output performance as well as both the combustion performance and the emission performance by suppressing the reverse flow of combustion gas into the intake system.

Solution to Problem

The present invention provides an internal combustion engine comprising: a cylinder block defining a cylinder; a piston slidable in the cylinder; a cylinder head mounted on the cylinder block to define a combustion chamber; an intake port and an exhaust port connected to the combustion chamber; an intake valve provided to the intake port to open and close the combustion chamber; an exhaust valve provided to the exhaust port to open and close the combustion chamber; a valve train for opening and closing the intake valve and the exhaust valve; a throttle body connected to an upstream end of the intake port; a throttle valve provided in the throttle body to open and close the throttle body; and a fuel injection valve for injecting fuel into the intake port; wherein a relation expressed by $Rv < 0.000438 \times \theta^2 - 0.0407 \times 8 + 1.55$ is satisfied in a range of an intake valve overlap amount $\theta(°)$ from 20° to 45°,
where Rv denotes an intake port volume ratio obtained by dividing an intake port internal volume Vp, as a volume of an intake port section from the throttle valve in engine idling to the intake valve in a closed state, by a cylinder stroke volume Vc as a total value of stroke volume of the cylinder which limits an intake air amount through the throttle valve; and the intake valve overlap amount $\theta(°)$ is a crank angle from an intake valve opening timing when the intake valve starts opening to an intake top dead center of the piston.

The arrangement as described above simplifies the valve train system for cost reduction, and improves the output performance as well as both the combustion performance and the exhaust gas emission performance by suppressing reverse flow of combustion gas into the intake system.

The present invention further provides an internal combustion engine comprising: a cylinder block defining a cylinder; a piston slidable in the cylinder; a cylinder head mounted on the cylinder block to define a combustion chamber; an intake port and an exhaust port connected to the combustion chamber; an intake valve provided to the intake port to open and close the combustion chamber; an exhaust valve provided to the exhaust port to open and close the combustion chamber; a valve train for opening and closing the intake valve and the exhaust valve; a throttle body connected to an upstream end of the intake port; a throttle valve provided in the throttle body to open and close the throttle body; and a fuel injection valve for injecting fuel into the intake port;
wherein an intake port volume ratio Rv satisfies a relation expressed by $Rv < 0.6$ in a range of an intake valve overlap amount $\theta(°)$ from 45° to 55°;
where Rv denotes an intake port volume ratio obtained by dividing an intake port internal volume Vp, as a volume of an intake port section from the throttle valve in engine idling to the intake valve in a closed state, by a cylinder stroke volume Vc as a total value of stroke volume of the cylinder which limits an intake air amount through the throttle valve; and the intake valve overlap amount $\theta(°)$ is a crank angle from an intake valve opening timing when the intake valve starts opening to an intake top dead center of the piston.

The arrangement as described above simplifies the valve train system in the range of the intake valve overlap amount $\theta$ from 45° to 55° for cost reduction. The structure improves the output performance as well as both the combustion performance and the exhaust gas emission performance by suppressing reverse flow of combustion gas into the intake system.

The structure as described above may be configured to satisfy the relation expressed by $\eta v < Rv$, where $\eta v$ denotes an idling volume efficiency obtained by dividing the intake air amount $V_1$ in an idling state of the engine (E) by an exhaust gas amount $V_0$, and Rv denotes the intake port volume ratio.

Making the intake port volume ratio Rv larger than the idling volume efficiency $\eta v$ makes the intake volume at the downstream side of the throttle valve greater than the intake air amount $V_1$ required for engine idling, and it is possible to improve all of the combustion performance, the emission performance, and the output performance without deteriorating drivability.

It is possible to use the valve train of a fixed valve timing type keeping valve timings unchanged.

Employment of the fixed valve timing type valve train operated at fixed valve timings provides advantages of improving the output performance as well as both the combustion performance and the emission performance by suppressing reverse flow of combustion gas into the intake system. Furthermore, as the variable valve timing type valve train is not necessary, the entire valve train system is simplified, resulting in manufacturing cost reduction. Additionally, lowering of the rotational speed limit is prevented.

It is possible to dispose the throttle body to form an angle of 60° or less between an axis of the throttle body and an axis of the cylinder, and to dispose an inlet of the intake port adjacent to the intake valve.

The above-described arrangement brings the throttle body close to the cylinder axis so as to make the cylinder head compact in size. This makes it possible to make the intake port volume ratio Rv small by reducing the intake port internal volume Vp for suppressing reverse flow of combustion gas into the intake system. The resultant combustion performance and the emission performance are further be improved.

The intake valve may be disposed at each of left and right sides of an axis of the throttle body, and the valve train may be arranged to act upon each intake valve, using an intake cam on a camshaft at a side of the exhaust valve via a rocker lever.

As the intake valve is acted upon by the intake cam disposed at the exhaust valve side via the rocker lever, the valve lifter for pressing the intake valve or the mechanism for retaining the valve lifter are no longer required. Additionally, the camshaft at the intake side of the intake valve is not required. This allows the valve chamber at the intake valve side to be made compact. It is therefore possible to bring the throttle valve and the fuel injection valve closer to the cylinder head, and to make the value of the intake port internal volume Vp smaller.

The intake valve may be disposed at each of left and right sides of an axis of the throttle body, and a connection member for connecting the intake port and the throttle body may be disposed in a recessed portion formed between walls of valve spring chambers for retaining springs each for acting upon each intake valve to close the same.

The connection member for connecting the intake port of the cylinder head and the throttle body is disposed in a recessed portion defined by the lower wall of the valve chamber and the wall of the valve spring chamber. The valve chamber accommodates the intake cam for controlling opening and closing operations of the intake valve. The valve spring chamber accommodates the spring that presses the intake valve toward the closing position. As a result, the position at which the intake port of the cylinder head is connected to the throttle body is brought closer to the intake valve side, resulting in reduced value of the intake port internal volume Vp.

The fuel injection valve may be disposed between the intake port and a valve chamber accommodating the valve train.

As the throttle body includes the fuel injection valve between the intake port and the valve chamber, the intake port is made more compact. Additionally, the intake port volume ratio Rv is further reduced.

It is possible to set the cylinder stroke volume Vc to 300 cc or less.

The structure is applicable to a compact internal combustion engine with cylinder stroke volume Vc set to 300 cc or less.

Advantageous Effects of Invention

The present invention simplifies the valve train system into a compact one for cost reduction, and improves the output performance as well as both the combustion performance and the exhaust gas emission performance by suppressing reverse flow of combustion gas into the intake system.

DESCRIPTION OF EMBODIMENTS

An internal combustion engine E according to a first embodiment of the present invention will be described referring to FIGS. 1 to 8. In the explanation herein, directions of front, rear, left, and right are generally determined in reference to the advancing direction of the motorcycle (not shown) as the front direction. The motorcycle has the internal combustion engine E according to the embodiment mounted thereon. In the figures of the drawings, FR denotes front direction, RR rear direction, LH left direction, and RH right direction.

Figure 1:
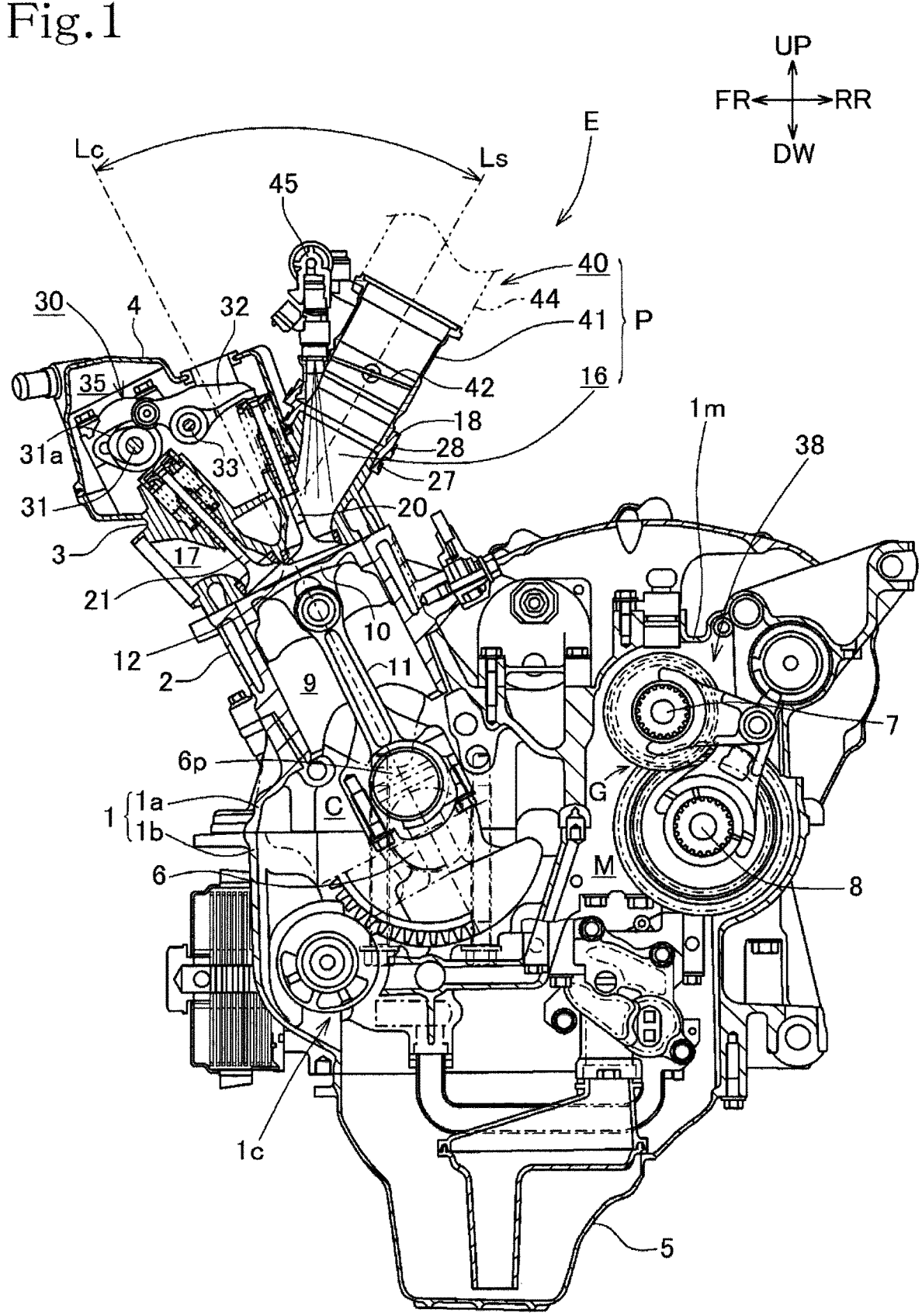
FIG. 1 is a longitudinal sectional view of an internal combustion engine according to a first embodiment of the present invention.

Referring to FIG. 1 showing a longitudinal sectional view of the internal combustion engine E, the engine E includes a unit case 1 formed by integrally combining a crankcase 1c and a transmission case 1m in the front-rear direction. The crankcase 1c forms a crank chamber C for installing a crankshaft 6. The transmission case 1m forms a transmission chamber M for installing a transmission 38. The unit case 1 is separably constituted by an upper unit case section 1a and a lower unit case section 1b.

A cylinder block portion 2 slightly inclined forward to extend upward is disposed on the upper portion of the upper unit case 1a. A cylinder head 3 is mounted on the cylinder block portion 2. A cylinder head cover 4 is mounted to cover the upper surface of the cylinder head 3. An oil pan 5 is attached to the lower portion of the unit case 1.

The crankshaft 6 is rotatably supported in the crankcase 1. A gear transmission mechanism G is formed between a main shaft 7 and a countershaft 8 which are disposed at the rear of the crankshaft 6. A chain (not shown) is stretched between the countershaft 8 and the axle of the rear wheel (not shown) so that power of the crankshaft 6 is transmitted to the rear wheel.

The cylinder block portion 2 includes a cylinder 9 formed longitudinally therein. A piston 10 is fitted in the cylinder 9 to slide in the longitudinal direction. A crank pin 6p of the crankshaft 6 is connected to the piston 10 via a connecting rod 11. A combustion chamber 12 is formed in the cylinder head 3. Combustion energy generated in the combustion chamber 12 of the internal combustion engine E is converted into kinetic energy of the piston 10. As a result, the piston 10 is moved up and down to rotatively drive the crankshaft 6 via the connecting rod 11. The cylinder stroke volume of the internal combustion engine E is set to 300 cc, for example.

Figure 2:
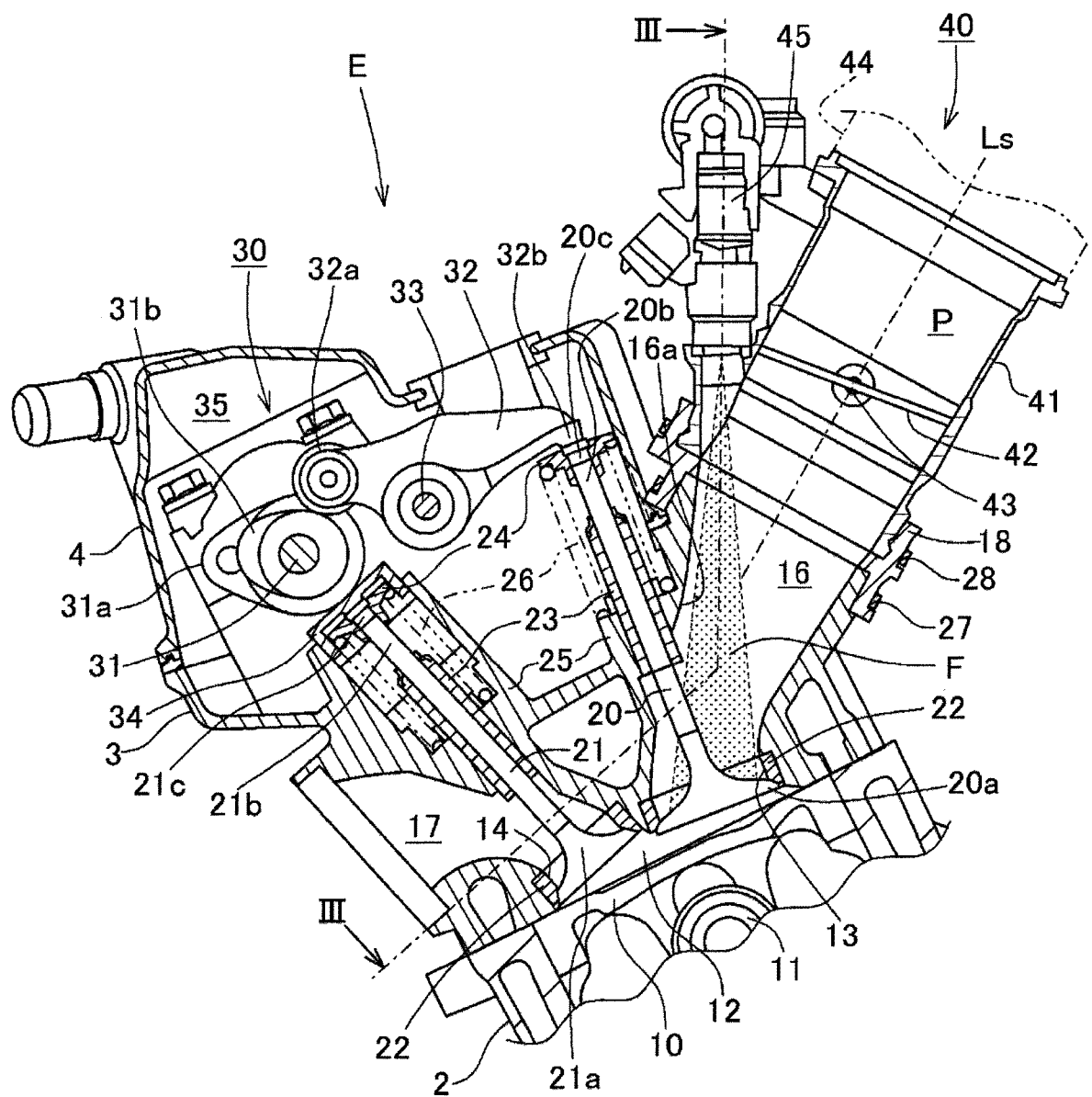
FIG. 2 is an enlarged sectional view of an essential portion of FIG. 1.
Figure 3:
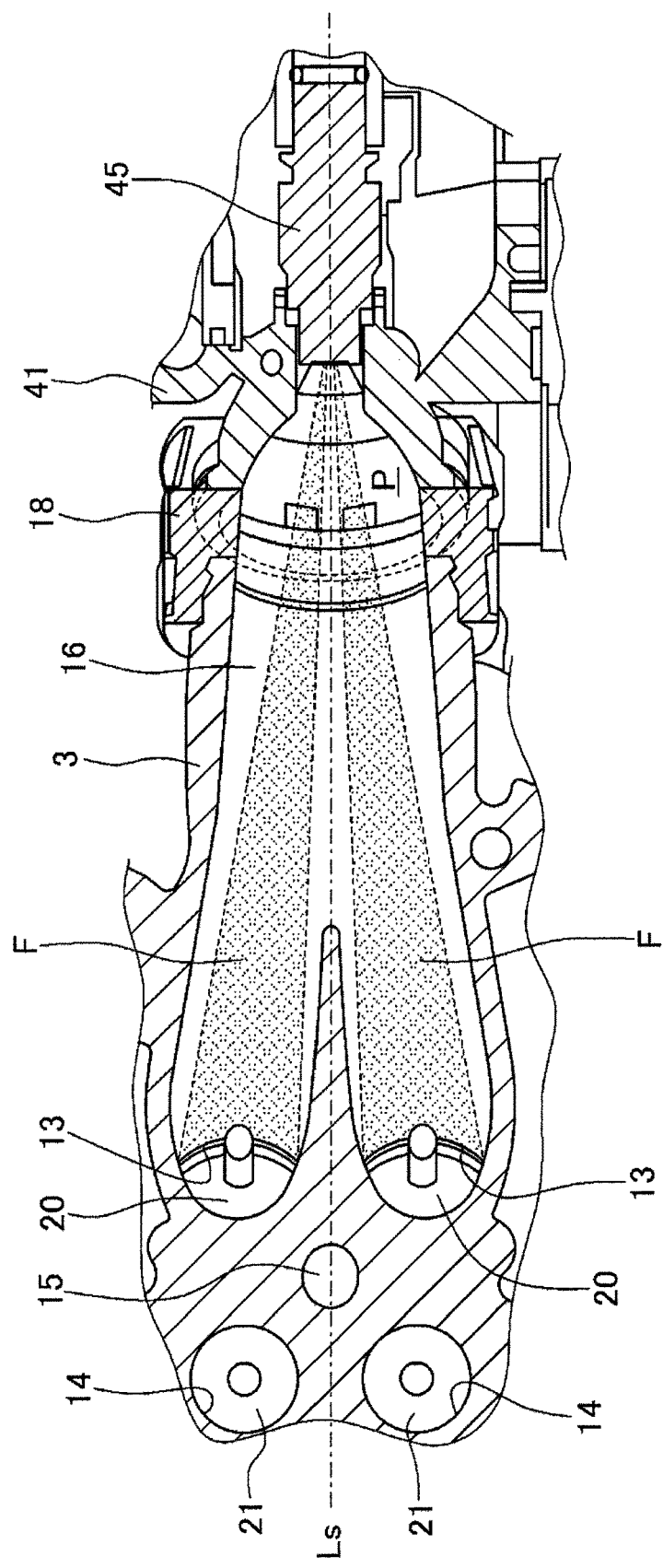
FIG. 3 is a sectional view taken along line of FIG. 2.

As FIG. 3 shows, the cylinder head 3 includes two intake valve openings 13, and two exhaust valve openings 14, all of which open in the upper wall surface of the combustion chamber 12. An ignition plug hole 15 is formed in substantially the center position between the intake valve openings 13 and the exhaust valve openings 14 for receiving an ignition plug (not shown). The intake valve openings 13 and the exhaust valve openings 14 respectively communicate with an intake port 16 and an exhaust port 17 (see FIG. 2) which are formed in the cylinder head 3.

As FIGS. 2 and 3 show, the internal combustion engine E has intake valves 20 each for opening and closing the corresponding one of the pair of intake valve openings 13, and exhaust valves 21 each for opening and closing the corresponding one of the pair of exhaust valve openings 14. The intake valves 20 control the intake flow from the intake port 16 into the combustion chamber 12. The exhaust valves 21 control the exhaust gas flow from the combustion chamber 12 to the exhaust port 17. Each of the intake valves 20 includes an umbrella portion 20a and a shaft portion 20b, and each of the exhaust valves 21 includes an umbrella portion 21a and a shaft portion 21b. The umbrella portions 20a and 21a are valve bodies for opening and closing the intake valve openings 13 and the exhaust valve openings 14, respectively in which valve seats 22 are press-fitted. The shaft portions 20b, 21b are slidably fitted to valve guides 23. The valve guides 23 extend outward of the combustion chamber 12 from the respective umbrella portions 20a and 21a, and are fitted in the cylinder head 3.

A shaft end 20c of each of the intake valves 20, and a shaft end 21c of each of the exhaust valves 21 protrude upward of the valve guides 23. Those shaft ends 20c and 21c have spring retainers 24, respectively. Each of coiled valve springs 26 is disposed under compression between the spring retainer 24 and a spring seat portion 25 which faces the spring retainer 24, and supported by the cylinder head 3 so as to enclose peripheries of the shaft portion 20b of the intake valve 20 and the shaft portion 21b of the exhaust valve 21. The intake valves 20 and the exhaust valves 21 are constantly urged by the coiled valve springs 26, respectively in the valve closing direction.

A valve train 30 configured to perform opening and closing operation of the intake valves 20 and the exhaust valves 21 is provided in a valve chamber 35 constituted by the cylinder head 3 and the cylinder head cover 4. The valve train 30 is of a fixed valve-timing type operated at fixed valve timings and includes a camshaft 31, an intake rocker lever 32, and a rocker lever shaft 33 which swingably supports the intake rocker lever 32. The camshaft 31 is integrally provided with an intake cam 31a for swinging the intake rocker lever 32, and an exhaust cam 31b for acting on the shaft end 21c of the exhaust valve 21 so as to open and close the exhaust valve 21 via a valve lifter 34.

The intake rocker lever 32 is swingably supported on the rocker lever shaft 33. A cam-side end portion 32a of the intake rocker lever 32 abuts on the intake cam 31a. Upon rotation of the camshaft 31, the intake rocker lever 32 is swung in accordance with the cam profile of the intake cam 31a. Then a valve-side end portion 32b of the intake rocker lever 32 acts on the shaft end 20c of each of the intake valves 20.

The camshaft 31 supports thereon a driven gear (not shown) so as to be integrally rotated. A cam chain (not shown) is stretched between the driven gear and the drive gear (not shown) integrally rotatable with the crankshaft 6. The camshaft 31 is then rotated in association with rotation of the crankshaft 6. Upon rotation of the camshaft 31, the intake cam 31a and the exhaust cam 31b are rotated so that the intake rocker lever 32 swings at a predetermined timing. Then the intake valve opening 13 and the exhaust valve opening 14 are opened and closed at predetermined timings.

The above-described valve train 30 employed for the internal combustion engine E allows the exhaust cam 31b on the camshaft 31 to directly press each of the exhaust valves 21 via the valve lifter 34. Each of the intake valves 20 is pressed via the intake rocker lever 32. This makes it possible to arrange the camshaft 31 closer to the exhaust valves 21, and to arrange the cam chain for driving the camshaft 31 closer to the exhaust valves 21. Furthermore, the intake valves 20 do not require the valve lifter, and a member for retaining the valve lifter. This makes it possible to make the valve chamber 35 at the intake side compact.

The compact intake-side valve chamber 35 allows arrangement of a throttle body 41 to be described later closer to the intake valves 20, resulting in reduced volume of the intake port 16. Arranging the camshaft 31 closer to the exhaust valves 21 suppresses protrusion of a cam chain tensioner (not shown) from the outline of the cylinder head 3. This prevents interference of the cam chain tensioner with the throttle body 41 to ensure further volume reduction of the intake port 16.

An intake device 40 is constituted by the throttle body 41, a connecting tube 44, and an air cleaner (not shown) disposed in sequence at the upstream side of the intake flow of the intake port 16 of the cylinder head 3. A downstream end of the throttle body 41 is attached to an upstream end of the intake port 16 via a connection member 18. The connection member 18 is fixed to the intake port 16 and the throttle body 41 via fastening members 27 and 28. The intake port 16, the throttle body 41, and the intake device 40 constitute an intake passage P.

Outside air taken from the air cleaner is fed to the intake passage P constituted by the intake device 40, the connecting tube 44, the throttle body 41, and the intake port 16 of the cylinder head 3. In the middle of the intake passage P, the air is mixed with atomized fuel injected from a fuel injection valve 45 inserted into the throttle body 41. The resultant mixture is supplied into the intake port 16, and further fed to the combustion chamber 12.

As FIG. 1 shows, the throttle body 41 is located at a position close to the cylinder head 3 at an angle of 60° or less between a throttle body axis Ls and a cylinder axis Lc. The intake port 16 has its inlet disposed close to the intake valves 20. As FIG. 3 shows, a pair of the intake valves 20 and a pair of the exhaust valves 21 are disposed at left and right sides with respect to the throttle body axis Ls.

As shown in FIG. 2, a butterfly-type throttle valve 42 is disposed inside the throttle body 41. The throttle valve 42 is opened and closed to control intake air amount in the intake passage so as to be rotatable about a throttle valve shaft 43. The throttle valve shaft 43 is rotatably supported by the throttle body 41 so as to be oriented at right angles to the throttle body axis Ls. The throttle valve shaft 43 is operated to take predetermined angles controlled by a throttle valve opening-closing mechanism not shown.

As illustrated in FIG. 1, the fuel injection valve 45 is inserted into the throttle body 41 so as to be positioned between the valve chamber 35 and the intake port 16 in the angular range from the cylinder axis Lc to the throttle body axis Ls. As FIG. 3 shows, the fuel injection valve 45 is configured to spray fuel toward each of the pair of intake valves 20. FIGS. 2 and 3 show fuel spray regions F as shaded areas enclosed by the two-dot chain lines. The regions F generally indicate areas where fuel sprayed from the fuel injection valve 45 is supplied to the intake port 16 and the throttle body 41 of the intake passage.

The fuel injection valve 45 is configured to inject fuel toward the regions at a downstream side of the valve guide 23 closer to the intake valves 20, that is, to the umbrella portions of the intake valves 20, at a spray cone angle in the injection direction to avoid adhesion of the fuel to the wall surface 16a of the intake port 16 at the upstream side of the valve guide 23. Avoidance of adhesion of the sprayed fuel to the wall surface 16a of the intake port 16 prevents inflow of the fuel liquid film into the combustion chamber 12. As a result, droplet combustion inside the combustion chamber 12 is prevented to suppress THC emission, resulting in improved emission performance.

In the present embodiment, the fuel injection valve 44 is mounted on the throttle body 41 such that the fuel is injected to the region at the downstream side of the throttle valve 42 in the intake passage P. It is also possible to provide the air cleaner and the fuel injection valve 45 in a region at the upstream side of the throttle valve 42 in the intake passage P.

Terms used in relation to the internal combustion engine E will be defined as follows.

Intake port internal volume Vp (cc) denotes the volume of a passage of the intake port connected to the single throttle valve 42, from the closed intake valve 20 to the throttle valve 42 in engine idling state. For example, in the case that only the single intake port 16 is connected to the single throttle body 41, and the intake air amount is controlled by the single throttle valve 42, the volume of the passage in the connected intake port 16 from the intake valve 20 to the throttle valve 42 is defined as the intake port internal volume Vp. In the case that a plurality of intake ports 16 are connected to the single throttle body 41, and the intake air amount is controlled by the single throttle valve 42, total volume of all the connected intake ports 16 from the intake valve 20 to the throttle valve 42 is defined as the intake port internal volume Vp. The intake port internal volume Vp (cc), that is, the volume of the passage or passages in the intake port or ports 16 from the closed intake valve 20 to the throttle valve 42 in engine idling state is substantially equal to the volume of the passage or passages in the intake port or ports 16 from the closed intake valve 20 to the closed throttle valve 42.

Cylinder stroke volume Vc (cc) denotes the total value of stroke volumes of all cylinders 9, having each intake air amount controlled by the single throttle valve 42. For example, in the case that each cylinder has the throttle valve, the cylinder stroke volume Vc denotes the cylinder stroke volume of the single cylinder. In the case that the single throttle valve operates to control two cylinders, the cylinder stroke volume Vc denotes total value of the cylinder stroke volumes of the two cylinders.

The intake port volume ratio Rv denotes the value obtained by dividing the intake port internal volume Vp (cc) by the cylinder stroke volume Vc (cc).

Figure 4:
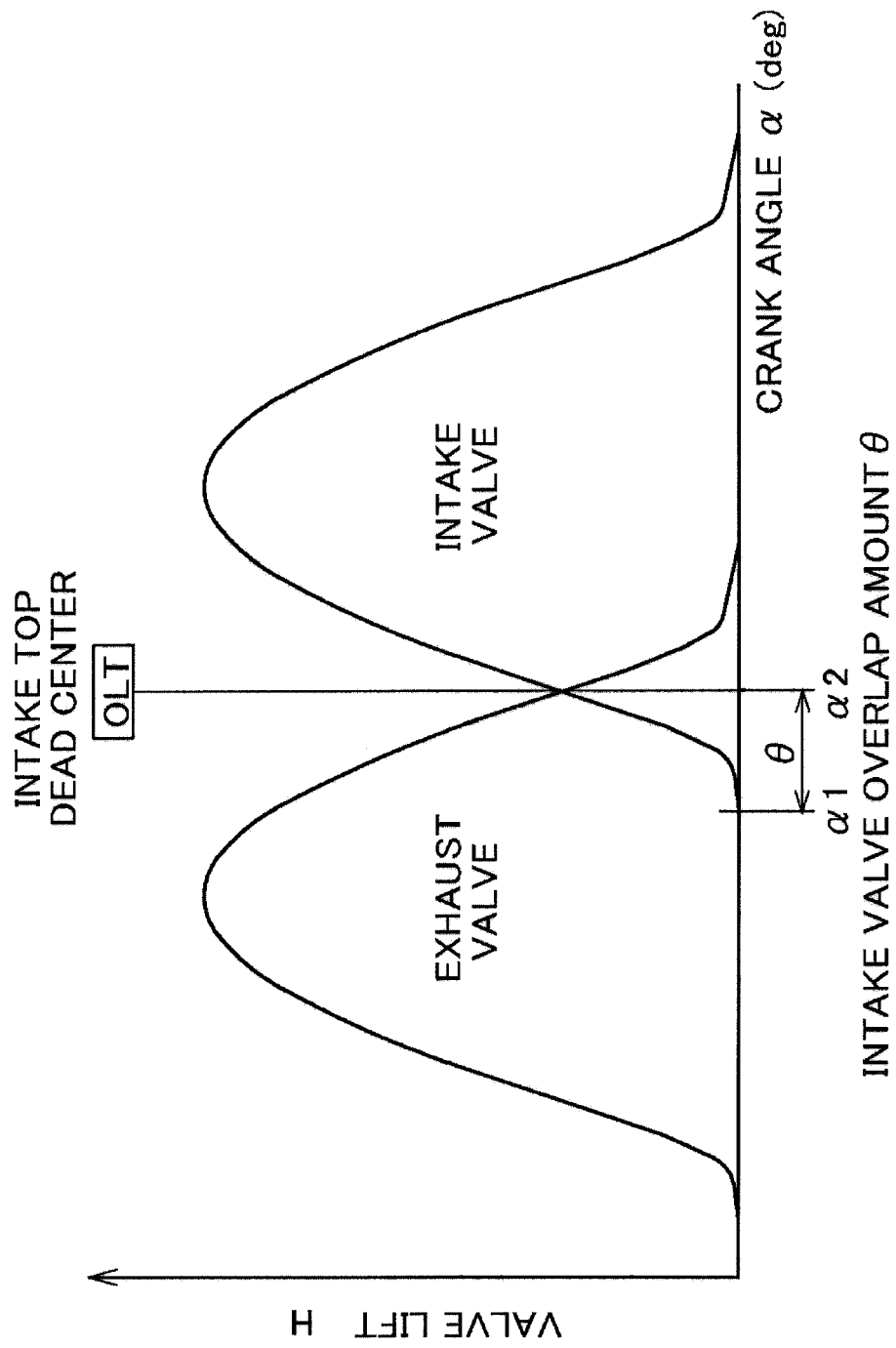
FIG. 4 is a graph showing cam profiles of an intake valve and an exhaust valve.

Intake valve overlap amount θ denotes, as shown in FIG. 4, crank angle from the timing at which the intake valve 20 starts opening (hereinafter referred to as the intake valve opening timing) to the timing of the intake top dead center OLT of the piston 10.

The internal combustion engine E according to the embodiment of the present invention is configured to satisfy the following condition in the range of the intake valve overlap amount θ(°) from 20° to 45°.

$$0 < Rv < 0.000438 \times \theta^2 - 0.0407 \times \theta + 1.55$$

The internal combustion engine is configured to further satisfy the following condition in the range of the intake valve overlap amount θ(°) from 45° to 55°.

$$0 < Rv < 0.6$$

The explanation will be made with respect to improvement of the output performance as well as the exhaust gas emission performance by suppressing reverse flow of the exhaust gas into the intake system, as a result of the internal combustion engine E configured to satisfy the above-described conditions.

FIG. 4 is a graph representing cam profiles of the intake valve 20 and the exhaust valve 21 of the internal combustion engine E, with the X-axis representing the crank angle α(°), and the Y-axis representing the valve lift H. During an overlap period, the intake valve 20 and the exhaust valve 21 are in open states concurrently. In the present invention, the crank angle range from a crank angle α1 at the intake valve opening timing to a crank angle α2 at the intake top dead center OLT of the engine E, as shown in FIG. 4, is defined as intake valve overlap amount) θ(°). This crank angle range θ shows a possibility of reverse flow of the exhaust gas into the intake port 16 from the intake valve 20 in open state while the piston 10 is moving upward toward its top dead center discharging the exhaust gas in the cylinder 9.

Figure 5:
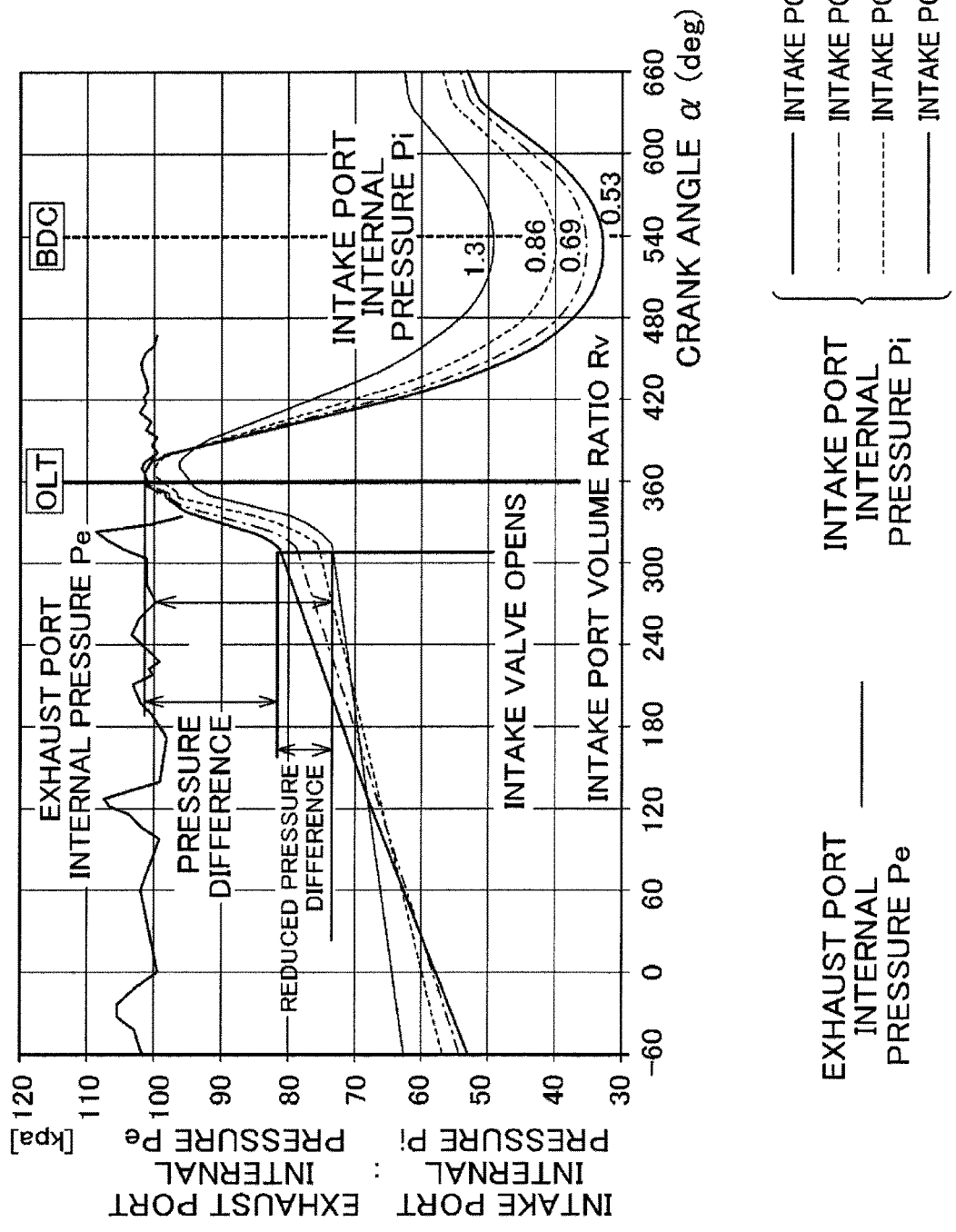
FIG. 5 is a graph representing relationships of crank angle of the internal combustion engine and intake and exhaust port internal pressures, with respect to different intake port volume ratios.

FIG. 5 is a graph showing changing values of intake port internal pressure Pi (kPa) and changing values of exhaust port internal pressure Pe (kPa) in relation to the crank angle α, which were measured in the idling state of the internal combustion engine at different intake port volume ratios Rv of 0.53, 0.69, 0.86, and 1.3. The graph has the X-axis representing the crank angle α(°), and the Y-axis representing values of both the intake port internal pressure Pi (kPa) and the exhaust port internal pressure Pe (kPa).

Referring to FIG. 5, the intake port internal pressure Pi is reduced due to expansion in the intake stroke, and takes a minimum value at the intake bottom dead center BDC. Then, after the intake valves 20 close, the pressure gradually recovers as a result of feeding from the throttle valve 42 and the like. At the timing when the intake valves 20 open, the pressure has been still negative with respect to the atmospheric pressure. There is the overlap period in the state where the intake valves 20 and the exhaust valves 21 are opened. Therefore, the intake port 16, the cylinder 9, and the exhaust port 17 are all communicated one another. As the intake valves 20 start opening, then the reverse flow of the exhaust gas into the intake port 16 occurs owing to the pressure difference relative to the exhaust port internal pressure Pe.

As the intake port volume ratio Rv is reduced, the intake port internal pressure Pi at the intake bottom dead center BDC is lowered, as will be seen from the curves shown. To the contrary, inflow of fresh air into the intake port 16 makes the pressure rise gradient greater. As a result, the intake port internal pressure Pi at the intake valve opening timing rises rapidly even at the same intake air amount. This clearly shows that the pressure difference between the exhaust port internal pressure Pe and the intake port internal pressure Pi becomes small. Decrease in the intake port internal volume Vp results in an equilibrium state with the exhaust port internal pressure Pe while reducing the reverse flow of the exhaust gas. Therefore, the reverse flow of the exhaust gas is further reduced, thus suppressing the reverse flow of the exhaust gas.

In a region around the intake top dead center OLT of the internal combustion engine, ratio of mass flow rate Rmf (g/s) of the exhaust gas which flows reversely from the cylinder 9 into the intake port 16 after passing through the intake valve 20 is calculated in relation to the crank angle α(°), with respect to each value of the above-mentioned intake port volume ratios Rv. The ratio of mass flow rate denotes mass of substance which passes through a given surface per unit time. Experimental results are shown in the graph of FIG. 6, having the X-axis representing the crank angle α(°), and the Y-axis representing the ratio of mass flow rate Rmf (g/s) of the exhaust gas which flows reversely.

Figure 6:
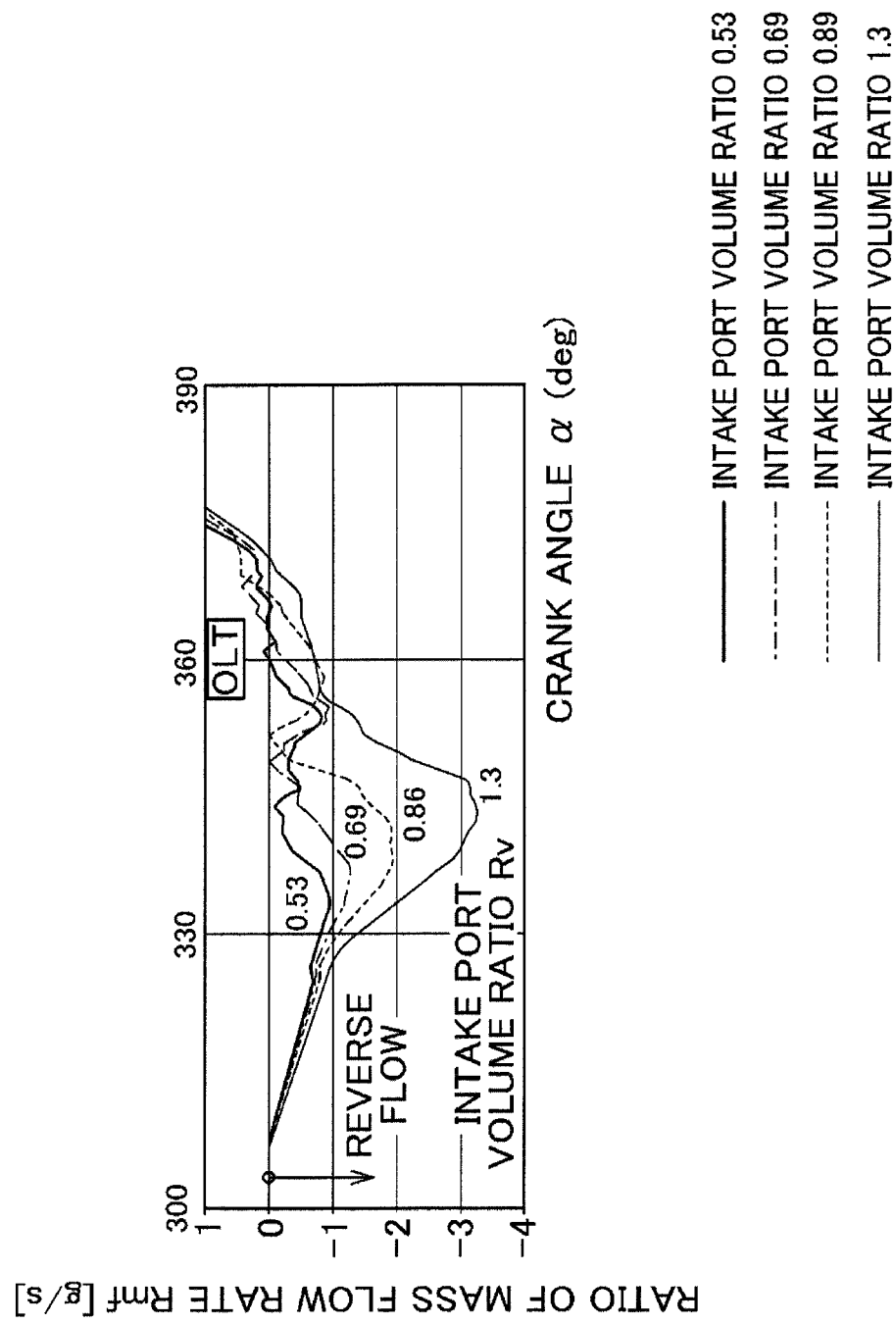
FIG. 6 is a graph representing relationship of crank angle of the internal combustion engine and ratio of mass flow rate of exhaust gas flowing into the intake port through the intake valve, with respect to different intake port volume ratios.

As FIG. 6 shows clearly, in a region from the timing at which the intake valve 20 starts opening to the intake top dead center OLT, the ratio of mass flow rate Rmf of the reversely flowing exhaust gas is smaller in value, as the intake port volume ratio Rv is smaller.

It will be noted from FIG. 6 that the reverse flow starts at an opening angle of the intake valve 20 at approximately 40° prior to the intake top dead center OLT, and then stops at an angle around the intake top dead center OLT. The above phenomenon is regulated by a period within which the intake port internal pressure Pi around the intake top dead center OLT rises until it is brought into equilibrium with the exhaust port internal pressure Pe. That is, the phenomenon is regulated by the timing at which the intake valve 20 is opened, and the engine speed in idling operation, in other words, a timing during the intake overlap period.

In the generally employed process of suppressing the reverse flow of the exhaust gas by shortening the valve overlap period, the intake valve opens at a timing later than the timing at which the intake valve 20 of the engine E according to the present embodiment opens. In the case of the known process, the intake stroke starts before the intake port internal pressure Pi is brought into equilibrium with the exhaust port internal pressure Pe, resulting in suppressed reverse flow of the exhaust gas. The effect derived in the generally employed process is enhanced as the intake valve overlap amount θ becomes smaller, and maximized in the state that the intake valve overlap amount θ is zero. Unlike the generally employed process, the effect derived from the internal combustion engine of the present embodiment is maximized when the intake valve overlap amount θ is 40° or greater. At the above timing at approximately 40° or greater before the intake top dead center OLT, the generally employed structure cannot provide any advantageous effect, whereas in the present invention, an advantage is obtained to the utmost even at the intake valve open timing of 40° or greater prior to the intake top dead center OLT. The intake valve overlap amount θ equal to or smaller than 40° is in a trade-off relation with the intake port internal volume Vp.

Experiment was conducted by measuring total hydrocarbon emission (hereinafter referred to as THC emission) of the internal combustion engine with respect to different values of the intake port volume ratio Rv at the intake valve opening timing at 43° prior to the intake top dead center OLT.

Figure 7:
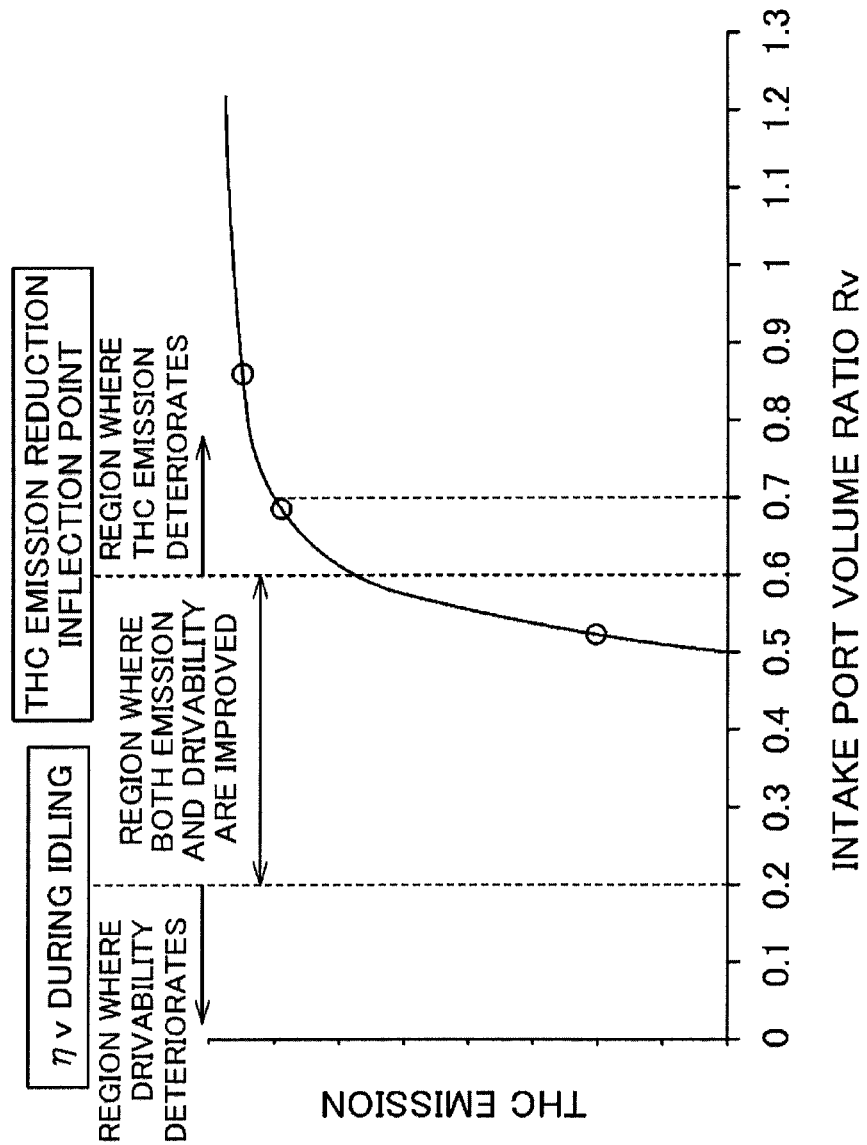
FIG. 7 is a graph representing relationship between the intake port volume ratio and THC emission.

FIG. 7 shows experimental results plotted in the graph, having the X-axis representing the intake port volume ratio Rv and the Y-axis representing the THC emission. As indicated in the graph, the THC emission starts reducing at the point where the intake port volume ratio Rv is 0.7 or lower. Especially, in the case of the intake port volume ratio Rv of 0.6 or lower, the THC emission is significantly reduced. In other words, the THC emission reduction point, that is, inflection point (hereinafter THC emission reduction inflection point) exists in the range of the intake port volume ratio Rv from 0.6 to 0.7. Therefore, the internal combustion engine should be designed to have an intake port volume ratio Rv set to 0.6 or smaller so as to improve the emission performance. It has been found that the residual exhaust gas ratio of the internal combustion engine E measured to be approximately 27% at the inflection point. Accordingly, the engine should be designed to have the residual exhaust gas ratio set to 27% or lower so as to improve the emission performance.

FIG. 7 shows values of THC emission reduction inflection points derived from internal combustion engines having different values of the intake port volume ratio Rv at the intake valve opening timing at 43° prior to the intake top dead center OLT. Under the conditions of the respective values of the intake valve opening timing of 23°, 27°, 33° and 38° prior to the intake top dead center OLT, desired values of the intake port volume ratio Rv at which the residual exhaust gas ratio becomes 27% were calculated. Based on the calculated values, the respective THC emission reduction inflection points were obtained.

Figure 8:
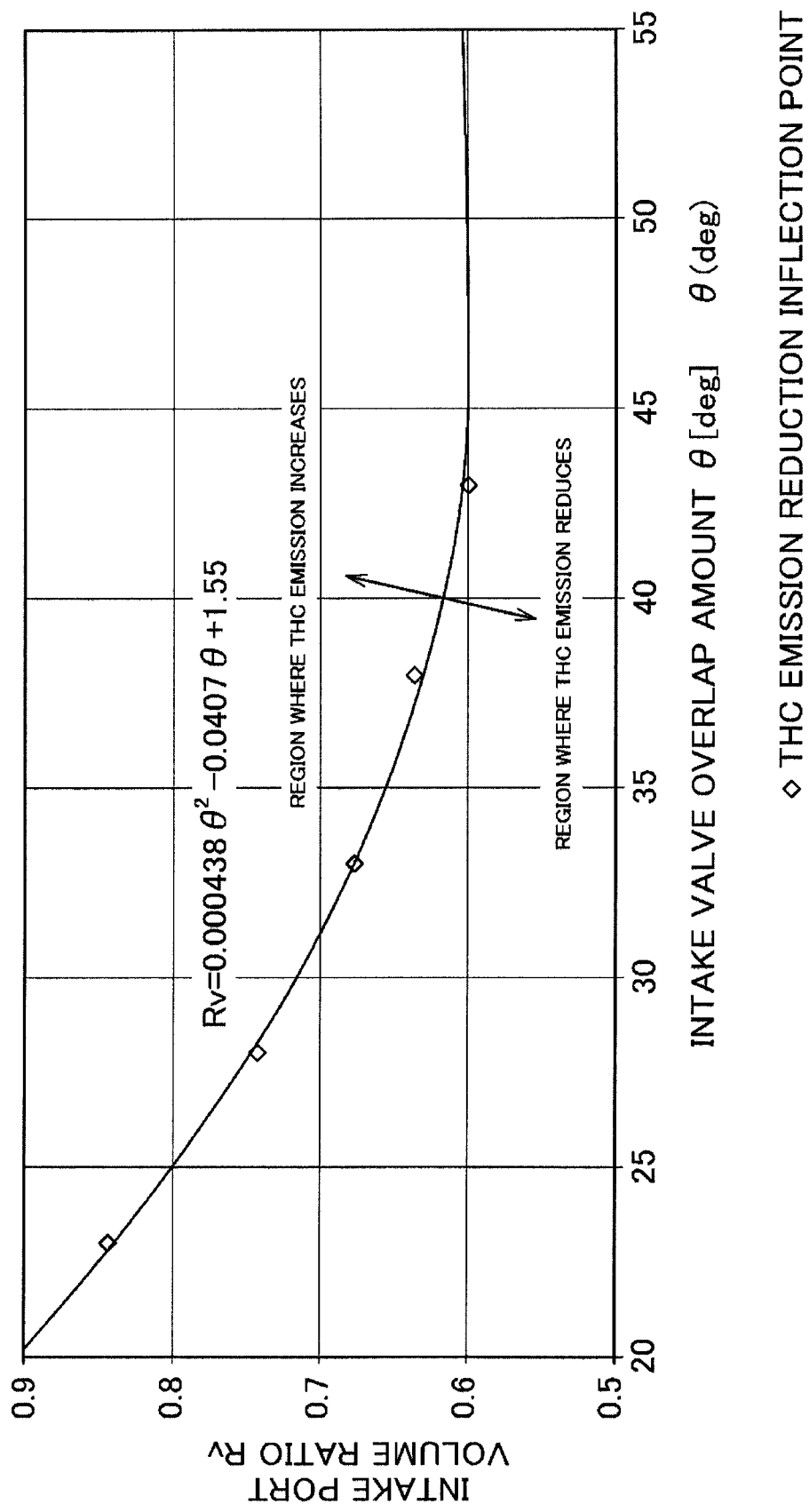
FIG. 8 is a graph representing relationship between intake valve overlap amount $\theta$ and the intake port volume ratio Rv.

FIG. 8 is a graph having the X-axis representing the intake valve overlap amount θ, and the Y-axis representing the intake port volume ratio Rv. The obtained values of the THC emission reduction inflection points are plotted on this graph to form a curve. Analysis of the curve shows that the curve is expressed by the following formula 1 using the intake valve overlap amount θ and the intake port volume ratio Rv.

$$Rv = 0.000438 \times \theta^2 - 0.0407 \cdot \theta + 1.55 \quad \text{(Formula 1)}$$

The curve expressed by the above formula 1 is derived from plotting the THC emission reduction inflection points. This shows that THC emission increases in the region above the curve, and the THC emission reduces in the region below the curve.

FIG. 8 indicates that in the case of small intake valve overlap amount θ of the internal combustion engine in the range from 20° to 45°, the reverse flow of the exhaust gas is reduced owing to shortened period of exhaust gas reverse flow. Then the intake port volume ratio Rv required for reducing the THC emission is increased.

It is clearly understood from FIG. 8 that the internal combustion engine which satisfies the relation expressed below improves the emission performance in the range of the intake valve overlap amount θ from 20° to 45°.

$$0 < Rv < 0.000438 \times \theta^2 - 0.0407 \times \theta + 1.55$$

In the range of the intake valve overlap amount θ from 45° to 55°, the intake port volume ratio Rv converges on the value of approximately 0.6.

The internal combustion engine which satisfies the relation expressed below improves the emission performance in the range of the intake valve overlap amount θ from 45° to 55°.

$$0 < Rv < 0.6$$

A lower limit of the intake port volume ratio Rv will be discussed. If the intake port internal volume Vp on the downstream side of the throttle valve 42 is smaller than the intake air amount $V_1$, flowing from the intake valve 20 into the cylinder 9, which is required for idling operation of the engine E, the pressure on the downstream side of the throttle valve 42 is kept at the atmospheric pressure or lower. It is therefore necessary to increase the intake air amount $V_1$ flowing from the throttle valve 42 and the like in the intake stroke by increasing the opening degree or flow rate of the throttle valve and the like to raise the intake port internal pressure Pi to the atmospheric pressure until the intake valve opening timing. In the case where the intake port internal pressure Pi is at the level of the atmospheric pressure even when the intake valve 20 is in fully closed state, a clear difference hardly exists between the fully closed state and a slightly open state of the throttle valve 42. In the aforementioned state, if the rider starts acceleration from the fully closed speed reduction state, or makes transition in the operation from a slightly open state to the fully closed speed reduction state, the rider's throttle operation causes unnecessarily excessive response, leading to deteriorated drivability. For this reason, the intake port volume ratio Rv needs to have a value equal to or higher than an idling volume efficiency ηv. The idling volume efficiency ηv is obtained by dividing the intake air amount $V_1$ in idling operation by a displacement $V_0$ as the stroke volume in the cylinder 9.

As described above, the intake port volume ratio Rv having a value of the idling volume efficiency ηv or a higher value contributes to improvement in the emission performance without deteriorating the performance requirement for the internal combustion engine.

The internal combustion engine E according to the first embodiment of the present invention is configured as described above and provides the following effects.

According to the first embodiment of the present invention, a relation expressed by $0 < Rv < 0.000438 \times \theta^2 - 0.0407 \times \theta + 1.55$ is satisfied in a range of an intake valve overlap amount θ(°) from 20° to 45°, where Rv denotes an intake port volume ratio obtained by dividing an intake port internal volume Vp as a volume of a passage from the throttle valve 42 in idling state to the closed intake valve 20, by a cylinder stroke volume Vc, and where the intake valve overlap amount θ(°) is a crank angle from an intake valve opening timing to an intake top dead center. This makes it possible to simplify the system of the valve train 30 for cost reduction, and improve the output performance as well as both the combustion performance and the emission performance by suppressing reverse flow of the combustion gas into the intake system.

In the range of the intake valve overlap amount θ from 45° to 55°, the relation expressed by 0<Rv<0.6 is satisfied. The intake valve overlap amount θ in the above-described range ensures to simplify the system of the valve train 30 for cost reduction, and improve the output performance as well as both the combustion performance and the emission performance by suppressing reverse flow of the combustion gas into the intake system.

The intake volume on the downstream side of the throttle valve is made greater than the intake amount required for idling operation so as to make the intake port volume ratio Rv greater than the idling volume efficiency ηv. This makes it possible to improve all of the combustion performance, the emission performance, and the output performance without deteriorating drivability.

The use of the fixed valve timing type valve train operated at fixed valve timings for the valve train 30 serves to improve the output performance as well as both the combustion performance and the emission performance by suppressing reverse flow of the combustion gas into the intake system. The variable valve timing type valve train is not required, thus simplifying the entire system of the valve train 30. This ensures to reduce manufacturing costs without lowering the rotational speed limit.

The throttle body 41 is disposed so that the angle formed between the throttle body axis Ls and the cylinder axis Lc is in the range from 0° to 60°. The inlet of the intake port 16 is thus brought adjacent to the intake valve 20. Bringing the throttle body 41 closer to the cylinder axis Lc allows the cylinder head 3 to be more compact. This makes it possible to reduce the intake port internal volume Vp, and make the intake port volume ratio Rv smaller. It is possible to improve both the combustion performance and the emission performance by suppressing reverse flow of the combustion gas into the intake system.

A pair of left and right intake valves 20 are disposed with respect to the throttle body axis Ls. As the intake valves 20 are driven by the intake cam 31a of the camshaft 31 at the side of the exhaust valve 21 via the intake rocker lever 32, the valve train 30 does not require the valve lifter for pressing the intake valves 20, the mechanism for retaining the valve lifter, and the camshaft at the side of the intake valve 20. Therefore, the valve chamber 35 at the side of the intake valve 20 is made compact. This makes it possible to bring the throttle valve 42 and the fuel injection valve 45 closer to the cylinder head 3, thus further reducing the intake port internal volume Vp.

The throttle body 41 includes the fuel injection valve 45 between the intake port 16 and the valve chamber 35. The intake port 16, therefore, is made further compact, making the value of the intake port volume ratio Rv smaller.

The cylinder stroke volume Vc set to 300 cc or less is applicable to a compact internal combustion engine.

Figure 9:
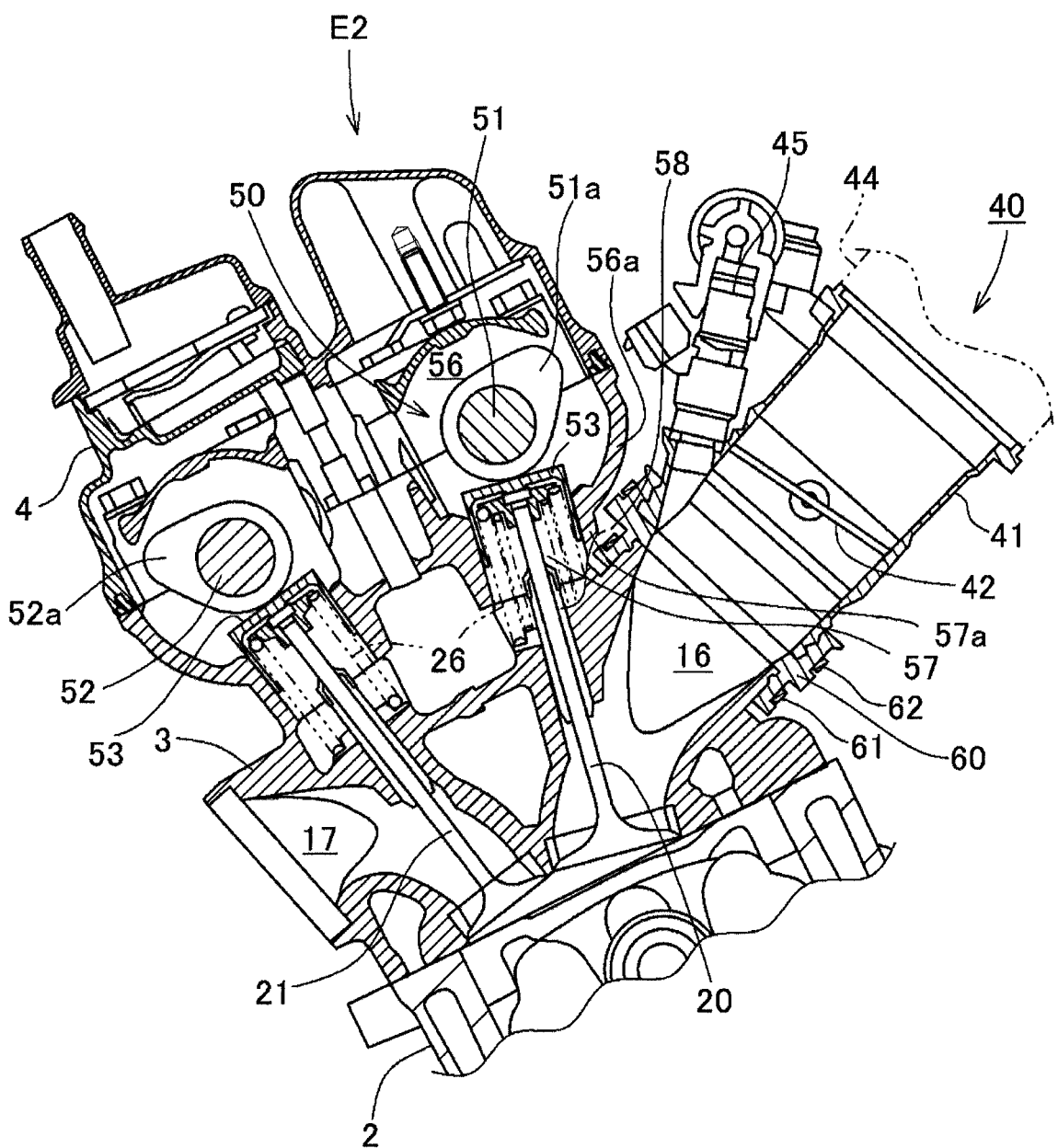
FIG. 9 is a longitudinal sectional view showing an essential portion of the internal combustion engine according to a second embodiment of the present invention.

An internal combustion engine E2 according to a second embodiment of the present invention will be described with reference to FIG. 9. The description will be made by using the same reference signs as in the first embodiment, for those elements equivalent to those described in the first embodiment.

The valve train 30 of the internal combustion engine E according to the first embodiment is configured to have the exhaust valves 21 directly acted upon by the exhaust cam 31b of the camshaft 31, and the intake valves 20 acted upon via the intake rocker lever 32. A valve train 50 of the DOHC-type internal combustion engine E2 according to the second embodiment includes an intake camshaft 51 and an exhaust camshaft 52. Each of the intake valves 20 is acted upon directly by an intake cam 51a on the intake camshaft 51, and each of the exhaust valves 21 is acted upon directly by an exhaust cam 52a on the exhaust camshaft 52 via corresponding valve lifters 53, respectively.

A cylinder head 3 of the internal combustion engine E2 includes a pair of valve spring chambers 57 for the respective intake valves 20. Each of the valve spring chambers 57 stores coiled valve spring 26 for pressing the intake valve 20 in the valve closing direction. A connecting member 60 for connecting the intake port 16 and the throttle body 41 is disposed in a recessed portion 58 defined by wall portions 57a of the pair of valve spring chambers 57. The connecting member 60 is fixed to the wall of the intake port 16 and the throttle body 41 with fastening members 61 and s62.

The internal combustion engine E2 according to the second embodiment is configured to have the pair of left and right intake valves 20 disposed with respect to the throttle body axis Ls therebetween. The connecting member 60 is disposed for connecting the intake port 16 and the throttle body 41 in the recessed portion 58 defined by the wall portions 57a of the respective valve spring chambers 57 for storing the coiled valve springs 26 acting in the valve closing direction. The use of DOHC-type valve train allows the connecting member 60 to be disposed in the recessed portion 58 defined by the wall portions 57a of the respective valve spring chambers 57 even if the valve chamber 56 cannot be made compact. It is possible to bring the location for connection between the intake port 16 and the throttle body 41 closer to the intake valve 20. This makes it possible to further reduce the intake port internal volume Vp.

The embodiments according to the present invention have been described in detail. The present invention, however, is not limited to the embodiments as described above, but may be modified in various forms. The internal combustion engine according to the present invention is applicable to saddle-ride type vehicles or the like without being limited to the motorcycle.

REFERENCE SIGNS LIST

E . . . Internal combustion engine
Vp . . . Intake port internal volume
Vc . . . Cylinder stroke volume
Rv . . . Intake port volume ratio
θ . . . Intake valve overlap amount
ηv . . . Idling volume efficiency
Lc . . . Cylinder axis
Ls . . . Throttle body axis
9 . . . Cylinder
10 . . . Piston
12 . . . Combustion chamber
16 . . . Intake port
17 . . . Exhaust port
20 . . . Intake valve
21 . . . Exhaust valve
26 . . . Coiled valve spring
30 . . . Valve train
31 . . . Camshaft
31a . . . Intake cam
32 . . . Rocker lever
35 . . . Valve chamber
41 . . . Throttle body
42 . . . Throttle valve
45 . . . Fuel injection valve
50 . . . Valve train
55 . . . Cylinder head
56a . . . Valve chamber wall
57b . . . Valve spring chamber wall
58 . . . Recessed portion
56 . . . Valve chamber
57 . . . Valve spring chamber
60 . . . Connecting member

The invention claimed is:

1. An internal combustion engine comprising:
a cylinder block defining a cylinder;
a piston slidable in the cylinder;
a cylinder head mounted on the cylinder block to define a combustion chamber;
an intake port and an exhaust port connected to the combustion chamber;
an intake valve provided to the intake port to open and close the combustion chamber;
an exhaust valve provided to the exhaust port to open and close the combustion chamber;
a valve train for opening and closing the intake valve and the exhaust valve;
a throttle body connected to an upstream end of the intake port;
a throttle valve provided in the throttle body to open and close the throttle body; and
a fuel injection valve for injecting fuel into the intake port;
wherein a relation expressed by $Rv < 0.000438 \times \theta^2 - 0.0407 \times \theta + 1.55$ is satisfied in a range of an intake valve overlap amount θ° from 20° to 45°,
where Rv denotes an intake port volume ratio obtained by dividing an intake port internal volume Vp, as a volume of an intake port section from the throttle valve in engine idling to the intake valve in a closed state, by a cylinder stroke volume Vc as a total value of stroke volume of the cylinder which limits an intake air amount through the throttle valve; and
the intake valve overlap amount θ° is a crank angle from an intake valve opening timing when the intake valve starts opening to an intake top dead center of the piston,
wherein a relation expressed by $\eta v < Rv$ is satisfied, where the ηv denotes an idling volume efficiency obtained by dividing the intake air amount $V_1$ in an idling state of the engine (E) by an exhaust gas amount $V_0$ and Rv denotes the intake port volume ratio.

2. The internal combustion engine according to claim 1, wherein the valve train is of a fixed valve timing type including an intake cam of a fixed contour and an exhaust cam of a fixed contour keeping valve timings unchanged.

3. The internal combustion engine according to claim 2, wherein the throttle body is disposed to form an angle of 60° or less between an axis (Ls) of the throttle body and an axis (Lc) of the cylinder, and
the intake port has an inlet disposed adjacent to the intake valve.

4. The internal combustion engine according to claim 2, wherein the intake valve includes a first intake valve disposed on a left side of an axis of the throttle body and a second intake valve disposed on a right side of the axis of the throttle body, and the valve train is arranged to act upon the first and second intake valves, using an intake cam on a camshaft at a side of the exhaust valve, via a rocker lever.

5. The internal combustion engine according to claim 1, wherein the throttle body is disposed to form an angle of 60° or less between an axis (Ls) of the throttle body and an axis (Lc) of the cylinder, and the intake port has an inlet disposed adjacent to the intake valve.

6. The internal combustion engine according to claim 5, wherein the intake valve includes a first intake valve disposed on a left side of an axis of the throttle body and a second intake valve disposed on a right side of the axis of the throttle body, and the valve train is arranged to act upon the first and second intake valves, using an intake cam on a camshaft at a side of the exhaust valve, via a rocker lever.

7. The internal combustion engine according to claim 1, wherein the intake valve includes a first intake valve disposed on a left side of an axis of the throttle body and a second intake valve disposed on a right side of the axis of the throttle body, and the valve train is arranged to act upon the first and second intake valves, using an intake cam on a camshaft at a side of the exhaust valve, via a rocker lever.

8. The internal combustion engine according to claim 1, wherein the intake valve includes a first intake valve disposed on a left side of an axis of the throttle body and a second intake valve disposed on a right side of the axis of the throttle body, and a connection sleeve for connecting the intake port and the throttle body is disposed in a recessed portion formed between walls of valve spring chambers for retaining springs each for acting upon the first and second intake valves to close the first and second intake valves.

9. The internal combustion engine according to claim 1, wherein the fuel injection valve is disposed between the intake port and a valve chamber accommodating the valve train.

10. The internal combustion engine according to claim 1, wherein the cylinder stroke volume Vc is equal to or less than 300 cc.

11. An internal combustion engine comprising:
a cylinder block defining a cylinder;
a piston slidable in the cylinder;
a cylinder head mounted on the cylinder block to define a combustion chamber;
an intake port and an exhaust port connected to the combustion chamber;
an intake valve provided to the intake port to open and close the combustion chamber;
an exhaust valve provided to the exhaust port to open and close the combustion chamber;
a valve train for opening and closing the intake valve and the exhaust valve;
a throttle body connected to an upstream end of the intake port;
a throttle valve provided in the throttle body to open and close the throttle body; and
a fuel injection valve for injecting fuel into the intake port;
wherein an intake port volume ratio Rv satisfies a relation expressed by Rv<0.6 in a range of an intake valve overlap amount θ° from 45° to 55°;
where Rv denotes an intake port volume ratio obtained by dividing an intake port internal volume Vp, as a volume of an intake port section from the throttle valve in engine idling to the intake valve in a closed state, by a cylinder stroke volume Vc as a total value of stroke volume of the cylinder which limits an intake air amount through the throttle valve; and
the intake valve overlap amount θ° is a crank angle from an intake valve opening timing when the intake valve starts opening to an intake top dead center of the piston,
wherein a relation expressed by ηv<Rv is satisfied, where the ηv denotes an idling volume efficiency obtained by dividing the intake air amount of V1 in an idling state of the engine (E) by an exhaust gas amount V0, Rv denotes the intake port volume ratio.

12. The internal combustion engine according to claim 11, wherein the valve train is of a fixed valve timing type including an intake came of a fixed contour and an exhaust cam of a fixed contour keeping valve timings unchanged.

13. The internal combustion engine according to claim 11, wherein the throttle body is disposed to form an angle of 60° or less between an axis (Ls) of the throttle body and an axis (Lc) of the cylinder, and the intake port has an inlet disposed adjacent to the intake valve.

14. The internal combustion engine according to claim 11, wherein the intake valve includes a first intake valve disposed on a left side of an axis of the throttle body and a second intake valve disposed on a right side of the axis of the throttle body, and the valve train is arranged to act upon the first and second intake valves, using an intake cam on a camshaft at a side of the exhaust valve, via a rocker lever.

15. The internal combustion engine according to claim 11, wherein the intake valve includes a first intake valve disposed on a left side of an axis of the throttle body and a second intake valve disposed on a right side of the axis of the throttle body, and a connection sleeve for connecting the intake port and the throttle body is disposed in a recessed portion formed between walls of valve spring chambers for retaining springs each for acting upon the first and second intake valves to close the first and second intake valves.

* * * * *